Patented Nov. 3, 1953

2,657,975

UNITED STATES PATENT OFFICE 2,657,975

PREPARATION OF ALUMINUM BOROHYDRIDE

James B. Hinkamp, Birmingham, Mich., assignor to Ethyl Corporation, New York, N. Y., a corporation of Delaware No Drawing. Application July 31, 1952, Serial No. 301,976

8 Claims. (Cl. 23—59)

The present invention relates to a process for preparing aluminum borohydride and more particularly to such a process wherein an alkali metal borohydride is reacted with an aluminum halide.

The prior art, in general, teaches three methods of preparing aluminum borohydride. The first process consists of reacting aluminum hydride with diborane, and the second involves interreaction of trimethyl aluminum with diborone. The third and most recent process comprises reacting an alkali metal borohydride with an aluminum halide. The first two methods are generally unsuitable except for laboratory scale operation, and therefore hold little promise from the standpoint of commercial production. The third process, however, appears to offer considerable promise for industrial production, and accordingly, my invention is directed to improvements in this process.

It is accordingly an object of my invention to provide an improved process for preparing aluminum borohydride. Another object of my invention is to provide an improved process for preparing aluminum borohydride from an alkali metal borohydride and an aluminum halide. A still further object of my invention is to provide an improved process for reacting sodium borohydride with aluminum chloride so as to obtain enhanced yields of aluminum borohydride. Still other objects of my invention will become apparent from the following description.

The above and other objects of my invention are accomplished by conducting the reaction between an alkali metal borohydride and an aluminum halide in the presence of minor amounts of an ester of phosphoric acid. As a result of my work in this field, I have found that a pronounced catalytic effect, resulting in enhanced yields of aluminum borohydride, is obtained when a catalytic amount of an ester of phosphoric acid is present in the reaction mixture. In general, when carrying out the reaction in accordance with my invention, yields of aluminum borohydride are increased on the order of 5 to 10 per cent over the yields generally obtained in the absence of my catalyst.

The prosphoric acid esters which I employ as catalysts in accordance with my invention are, in general, the primary, secondary, and tertiary esters. Typical examples of primary esters which can be employed include the corresponding monomethyl, monoethyl, monopropyl, monoisopropyl, monobutyl, monoisobutyl, monoisoamyl, monobenzyl, monophenyl, mono-p-tolyl, mono-α-naphthyl phosphates and the like. Typical examples of the secondary esters of phosphoric acid which I employ as catalysts are the dimethyl, methyl ethyl, diethyl, dipropyl, diisoamyl, dibenzyl, ethyl phenyl, phenyl-p-tolyl, di-β-naphthyl and the like esters of phosphoric acid. The tertiary esters include trimethyl, dimethyl monoethyl, monomethyl diethyl, triethyl, dimethyl monopropyl, monomethyl dipropyl, diethyl monopropyl, monoethyl dipropyl, tripropyl, triisopropyl, diethyl monobutyl, monoethyl dibutyl, tributyl, triisobutyl, triamyl, monobutyl diisoamyl, triisoamyl, diethyl monophenyl, ethyl propyl phenyl, triphenyl, tricresyl and the like phosphates. The tri-alkyl esters are preferred, and I have found that tri-n-butyl phosphate is particularly useful.

The amount of ester which is incorporated in the reaction mixture is generally small and need not exceed 5 per cent by weight of the alkali metal borohydride employed; the preferred range is between 0.5 and 2 per cent by weight of alkali metal borohydride.

Since the reactants are relatively unstable with respect to oxidation and hydrolysis, it is necessary to carry out the reaction in the absence of air, preferably using an inert atmosphere such as dry nitrogen. The apparatus generally employed consists of a reaction vessel sealed to a vacuum system and provided with means for maintaining an inert atmosphere. It is also desirable to provide means for heating and cooling the reaction vessel, and to provide means for stirring or agitating the reactants. The products evolve during the reaction as vapors and can be collected by means of a series of cold traps positioned between the vacuum pump and the reaction vessel. Although, as mentioned before, it is desirable to provide means for stirring or agitating the reactants during the reaction, another somewhat less satisfactory method consists of intimately mixing the reactants in an inert atmosphere prior to charging them to the reaction flask.

The reaction iself is conducted by progressively heating the mixture to about 150° C. at a pressure not in excess of 5 mm. Hg over a period of 5 to 6 hours. The product evolution begins at a temperature of about 45 to 50° C. and reaches a peak rate at a temperature of about 90° C. At 150° C. the reaction is substantially complete. The cold traps serving to recover product should be maintained at a temperature of about −196° C. so as to condense both the aluminum borohydride and the by-product diborane. The aluminum borohydride is then recovered from this product mixture by fractional condensation. The phosphate catalyst is added at the time the reactants are placed in the reaction vessel. When the reaction vessel is not provided with a stirring mechanism it is advisable to premix the reactants and the catalyst in an inert atmosphere prior to placing the reactants in the reaction vessel.

The following examples, in which all parts and percentages given are on a weight basis, will serve to further illustrate my invention.

Example I

The reactants, 9.13 parts of sodium borohydride (96.3 per cent pure) and 15.44 parts of aluminum chloride (50 per cent excess), were premixed in a nitrogen atmosphere and then placed in a reaction vessel. The vessel was sealed to a vacuum system and progressively heated to 135° C. over a four-hour period. A pressure of about 1 mm. Hg was maintained throughout the run, and the addition of heat was controlled so that the pressure was not permitted to rise above this value. Since the reaction vessel was not provided with a stirring means, after the initial four-hour period the reactants were removed, remixed, and replaced in the vessel. The vessel was again sealed, the vacuum established, and the reactants were progressively heated for an additional period of 3 hours to a temperature of 155° C. The products were recovered in a nitrogen cooled trap maintained at −196° C. The aluminum borohydride was removed from the product mixture by fractional condensation, and the yield of aluminum borohydride was 68 per cent of theoretical.

Example II

Using an apparatus substantially identical to that described in Example I, 9.13 parts of sodium borohydride (96.3 per cent pure) was reacted with 15.44 parts of aluminum chloride. In this instance a catalytic amount (1 per cent by weight of the sodium borohydride) of tri-n-butyl phosphate was added to the reaction mixture. As in Example I, prior to placing the reactants in the reaction vessel they were mixed by grinding in a nitrogen atmosphere. The mixture was progressively heated to 130° C. over a four-hour period, and at the end of this time the reactants were cooled and removed from the reaction vessel so as to permit additional mixing. The reactants were then replaced in the reaction vessel and heated to 155° C. over a three-hour period. In this instance the yield of aluminum borohydride obtained represented 87 per cent of theoretical.

Example III

Using the same quantities of reactants and the same procedure as in Example II, a yield of aluminum borohydride was obtained equivalent to 83 per cent of theoretical.

In Example I, when no catalyst was employed, the yield of aluminum borohydride was only 68 per cent, and although yields as high as 75 per cent have been obtained in the absence of the catalyst, Examples II and III clearly demonstrate that yields are considerably enhanced when a phosphate catalyst is employed in accordance with my invention. Other phosphates can be employed in the manner described in the above examples. For example, good results are obtained using tripropyl phosphate, monoethyl phosphate, diethyl phosphate, triamyl phosphate, triphenyl phosphate, or any of the other phosphoric acid esters disclosed herein.

Of the various alkali metal borohydrides, I prefer sodium borohydride since it is readily prepared and potentially capable of being available in commercial quantities. Although lithium borohydride is less attractive from the standpoint of availability, it is superior to the other alkali metal borohydrides in that it will react to give higher yields of aluminum borohydride. Potassium borohydride or any of the other alkali metal borohydrides can also be used. Aluminum chloride is the preferred halide in the present process, although aluminum bromide can also be successfully employed. The amount of aluminum halide used can vary from stoichiometric amounts up to 50 per cent or more in excess of stoichiometric. The aluminum borohydride prepared in accordance with my invention is useful as a chemical intermediate and as a reducing agent. Aluminum borohydride is also useful as a fuel additive for jet propelled aircraft.

It is to be understood that the above examples are given only for the purpose of illustrating specific embodiments, and I intend by the appended claims to cover all modifications within the spirit and scope of my invention.

I claim:

1. A process for preparing aluminum borohydride comprising reacting an aluminum halide with an alkali metal borohydride in the presence of a minor amount of an ester of phosphoric acid.

2. A process as defined in claim 1 in which said ester is tricresyl phosphate.

3. A process as defined in claim 1 in which said ester is a tri-alkyl ester of phosphoric acid.

4. A process as defined in claim 3 wherein said ester is tributyl phosphate.

5. A process as defined in claim 3 wherein said ester is triethyl phosphate.

6. A process for preparing aluminum borohydride comprising reacting sodium borohydride with aluminum chloride in the presence of a minor amount of tributyl phosphate.

7. A process for preparing aluminum borohydride comprising reacting an aluminum halide with an alkali metal borohydride in the presence of up to about 5% of an ester of phosphoric acid based on the weight of the alkali metal borohydride used.

8. A process for preparing aluminum borohydride comprising reacting sodium borohydride with aluminum chloride at temperatures up to about 150° C. and at pressures up to about 5 mm. Hg in the presence of about 0.5 to 2% of tri-n-butyl phosphate based on the weight of the sodium borohydride used.

JAMES B. HINKAMP.

References Cited in the file of this patent

UNITED STATES PATENTS

| Number | Name | Date |
| --- | --- | --- |
| 2,599,203 | Schlesinger | June 3, 1952 |